United States Patent
Eslinger et al.

(10) Patent No.: US 12,146,495 B2
(45) Date of Patent: Nov. 19, 2024

(54) METHODS RELATED TO STARTUP OF AN ELECTRIC SUBMERSIBLE PUMP

(71) Applicant: Sensia LLC, Houston, TX (US)

(72) Inventors: David Milton Eslinger, Collinsville, OK (US); Yves-Marie Clet Robert Subervie, Houston, TX (US); Emmanuel Coste, Houston, TX (US); Anna Danuta Sadowska, Cambridge (GB); Leo Vincent Steenson, Cambridge (GB)

(73) Assignee: SENSIA LLC, Houston, TX (US)

( * ) Notice: Subject to any disclaimer, the term of this patent is extended or adjusted under 35 U.S.C. 154(b) by 1073 days.

(21) Appl. No.: 16/609,082

(22) PCT Filed: Apr. 18, 2018

(86) PCT No.: PCT/US2018/028046
§ 371 (c)(1),
(2) Date: Oct. 28, 2019

(87) PCT Pub. No.: WO2018/200269
PCT Pub. Date: Nov. 1, 2018

(65) Prior Publication Data
US 2020/0208639 A1 Jul. 2, 2020

Related U.S. Application Data

(60) Provisional application No. 62/491,851, filed on Apr. 28, 2017.

(51) Int. Cl.
*F04D 13/10* (2006.01)
*E21B 43/12* (2006.01)
(Continued)

(52) U.S. Cl.
CPC ............ *F04D 13/10* (2013.01); *E21B 43/128* (2013.01); *E21B 47/008* (2020.05); *F04D 15/00* (2013.01); *G05B 13/042* (2013.01)

(58) Field of Classification Search
CPC .......... F04D 13/10; F04D 15/00; F04D 13/08; F04D 15/0088; F04D 17/03;
(Continued)

(56) References Cited

U.S. PATENT DOCUMENTS

2005/0273296 A1 12/2005 Zhu et al.
2009/0157590 A1 6/2009 Mijares et al.
(Continued)

FOREIGN PATENT DOCUMENTS

EP 3 339 565 A1 6/2018
WO WO-2016/094530 A1 6/2016
(Continued)

OTHER PUBLICATIONS

European Search Report on EP Appl. Ser. No. 18790864.5 dated Dec. 16, 2020 (10 pages).
(Continued)

*Primary Examiner* — Alexander B Comley
(74) *Attorney, Agent, or Firm* — Foley & Lardner LLP

(57) ABSTRACT

A method for controlling an ESP-lifted well in an optimal fashion using the ESP speed and choke opening as actuators subject to operational constraints.

11 Claims, 9 Drawing Sheets

(51) Int. Cl.
*E21B 47/008* (2012.01)
*F04D 15/00* (2006.01)
*G05B 13/04* (2006.01)

(58) Field of Classification Search
CPC .... F04D 23/021; E21B 43/128; E21B 47/008; F04B 47/06; F04B 49/02; F04B 49/065; G05B 13/04–042
See application file for complete search history.

(56) References Cited

U.S. PATENT DOCUMENTS

| | | | |
|---|---|---|---|
| 2012/0095733 | A1 | 4/2012 | Rossi |
| 2014/0039836 | A1* | 2/2014 | Moricca ............. F04D 15/0088 702/184 |
| 2015/0241881 | A1 | 8/2015 | Ige et al. |
| 2016/0265341 | A1 | 9/2016 | Subervie et al. |
| 2016/0290077 | A1* | 10/2016 | Aske ................... E21B 47/008 |
| 2017/0045055 | A1 | 2/2017 | Hoefel et al. |
| 2017/0089192 | A1 | 3/2017 | Rendusara et al. |
| 2017/0292351 | A1* | 10/2017 | Boiko ................... E21B 43/122 |
| 2017/0356279 | A1* | 12/2017 | Nandola ................ E21B 47/04 |
| 2017/0363088 | A1* | 12/2017 | Nguyen ................ E21B 47/008 |
| 2018/0066501 | A1* | 3/2018 | Chidiac .................. G06F 30/20 |
| 2018/0209248 | A1* | 7/2018 | Patel ...................... G06Q 10/06 |

FOREIGN PATENT DOCUMENTS

| | | |
|---|---|---|
| WO | WO-2016/108872 A1 | 7/2016 |
| WO | WO-2016/153502 A1 | 9/2016 |

OTHER PUBLICATIONS

International Search Report and Written Opinion on PCT/US2018/028046 dated Jul. 27, 2018.
EPO Search Report for EP Appl. Ser. No. 23158528.2 dated May 31, 2023 (8 pages).

* cited by examiner

METHODS RELATED TO STARTUP OF AN ELECTRIC SUBMERSIBLE PUMP

PRIORITY

This application claims priority to U.S. Patent Application No. 62/491,851, filed Apr. 28, 2017, and is incorporated by reference in its entirety for all purposes.

BACKGROUND

Artificial lift equipment such as electric submersible pumps (ESPs) may be deployed for any of a variety of pumping purposes. For example, where a reservoir fluid does not readily flow responsive to existing natural forces, an ESP may be implemented to artificially lift the fluid. To receive power to power an electric motor, an ESP is connected to a cable or cables, which are, in turn, connected to a power drive. In some instances, an ESP may be deployed with one or more sensors (e.g., a gauge or gauges). Communication of information with ESP equipment may occur via a power cable, which may, depending on type of deployment, be of a length of the order of hundreds of meters or more. Various technologies, techniques, etc., described herein pertain to circuitry, for example, circuitry that may estimate pump flow rate, circuitry that may control pump equipment, etc.

SUMMARY

In general, the disclosure relates to methods for controlling an ESP-lifted well in an optimal fashion using the ESP speed and choke opening as actuators subject to operational constraints.

In an embodiment of the present disclosure, a method for optimizing a model-based offline startup schedule for an electric submersible pump is provided. The method comprises defining the startup operational parameters (e.g. surface flowrate) and establishing the constraints for the operational parameters (e.g. bounds on motor temperature). A physical model is defined and the operational parameters, constraints and physical model are entered into a processor. The model-based offline start-up schedule is next developed based on the operational parameters, the constraints, and the physical model. Finally, the model-based offline startup schedule is executed for the electric submersible pump.

In another embodiment of the present disclosure, a method of developing a control algorithm for an electric submersible pump startup using model-predictive control is provided. The method comprises defining the objective of the control algorithm and then translating the objective into a cost function that mathematically describes the objective. Next, system responses to control inputs are simulated with a processor. The optimal control actions are determined by optimizing the cost function, and the electric submersible pump is controlled based on the optimal control actions.

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
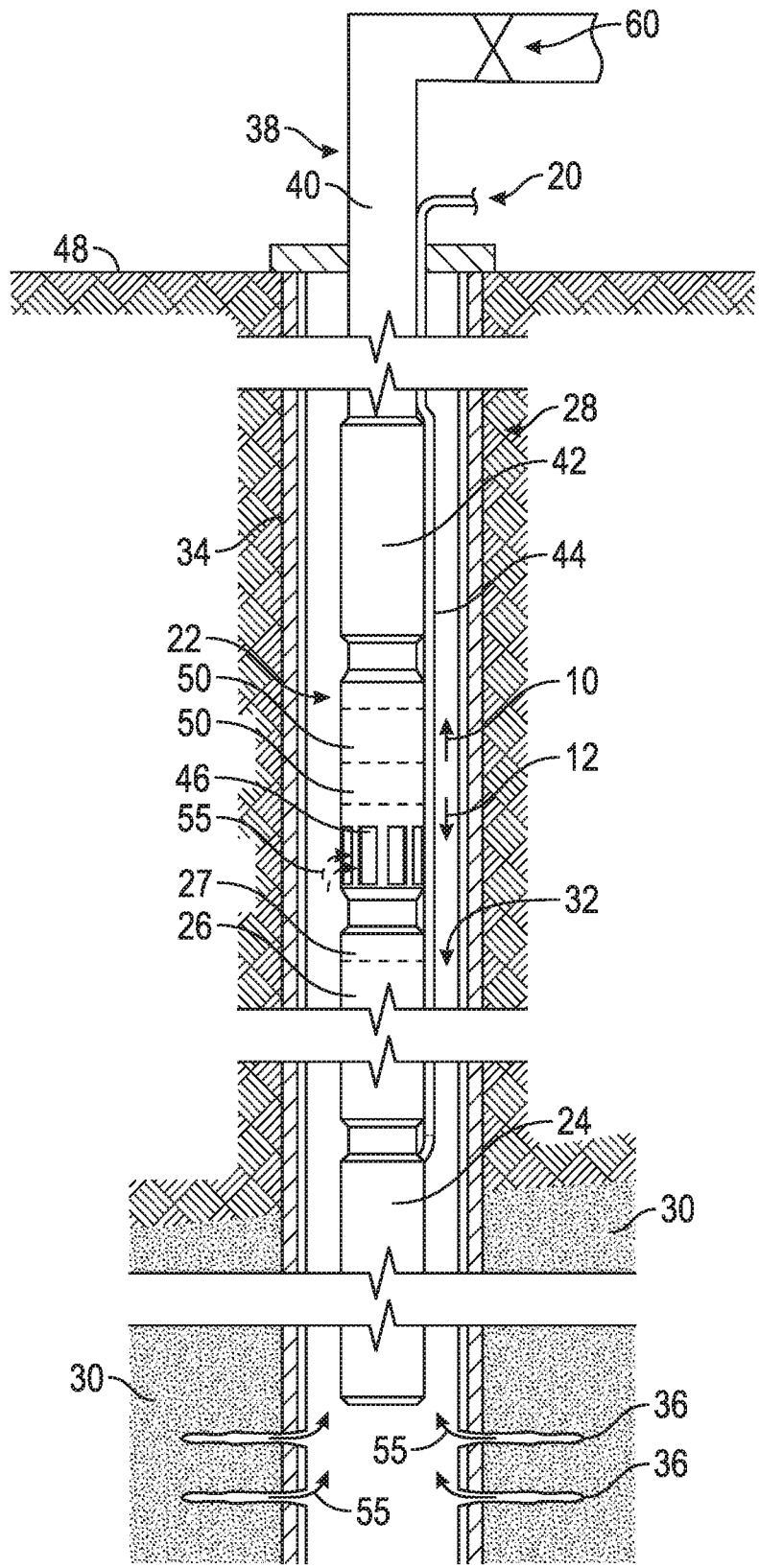
FIG. 1 is an illustration of an example ESP installation, according to an embodiment of the disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface. As used herein, the term "well" can refer to an oil well, water well, geothermal well or any other well that may be artificially lifted with an electrical submersible pump (ESP).

The disclosure relates to model-based methods for developing offline startup schedules for electrical submersible pumps (ESPs). The startup schedules may include motor frequency and wellhead choke versus time during the startup. For purposes of this disclosure, offline means that the startup schedule is developed before commencing the startup and the startup schedule is not adjusted in real-time based on real-time sensor data. The disclosure also relates to model-based adjustment of a startup schedule in real-time based on real-time sensor data. The disclosure additionally relates to a method to startup an ESP-lifted well using model-predictive control (MPC). Model-predictive control is an advanced control method that may use a system model to compute control actions to be applied to the system by solving a constrained optimization problem.

The disclosed methods may utilize the ESP and wellhead choke as actuators and provide optimal startup sequences dictating how the actuators should be operated for a given cost function defined in a way to provide protection to the reservoir (e.g., to avoid formation damage due to excessively rapid drawdown), to the pump (e.g., to avoid operating the pump outside of the pump's optimal operating range), and to the topside processing facilities (e.g., to avoid large pressure or flowrate variations). Some embodiments of the disclosure provide individual well-tailored profiles and/or multi-well (e.g., for the whole platform) standardized profiles for given wells.

FIG. 1 illustrates an electrical submersible pump system 20 deployed in a well 28. Submersible pumping system 20 may comprise a variety of components depending on the particular application or environment in which it is used. The illustrated pumping system 20 includes a pump 22 coupled to an electric motor 24 and a motor protector 26. Pump 22 may include two or more stages 50, e.g., compression stages. The pump stages 50 are characterized by the angle of flow passages in the impellers. The stages 50 may be radial flow, mixed flow, or axial flow. The net thrust load, e.g. downthrust load, resulting from rotation of the impellers may be resisted by a bearing 27 illustrated in FIG. 1 in motor protector 26. For the purpose of clarity, arrow 10 indicates the direction of upthrust and an arrow 12 indicates the direction of downthrust.

Well 28 includes a wellbore 32 drilled into a geological formation 30 containing for example a desirable production fluid 55, such as petroleum. Wellbore 32 may be lined with a tubular casing 34. Perforations 36 are formed through wellbore casing 34 to enable flow of fluids between the surrounding formation 30 and the wellbore 32. Submersible pumping system 20 is deployed in wellbore 32 by a deployment system 38 that may have a variety of configurations. For example, deployment system 38 may comprise tubing 40, such as coiled tubing or production tubing, connected to submersible pump 22 by a connector 42. Power may be provided to the submersible motor 24 via a power cable 44. The submersible motor 24, in turn, powers submersible pump 22 which can be used to draw in production fluid 55 through a pump intake 46. Within submersible pump 22, a plurality of impellers are rotated to pump or produce the production fluid 55 through, for example, tubing 40 to a desired collection location which may be at a surface 48 of the Earth. The submersible pumping system 20 may additionally comprise a wellhead choke 60.

Figure 2:
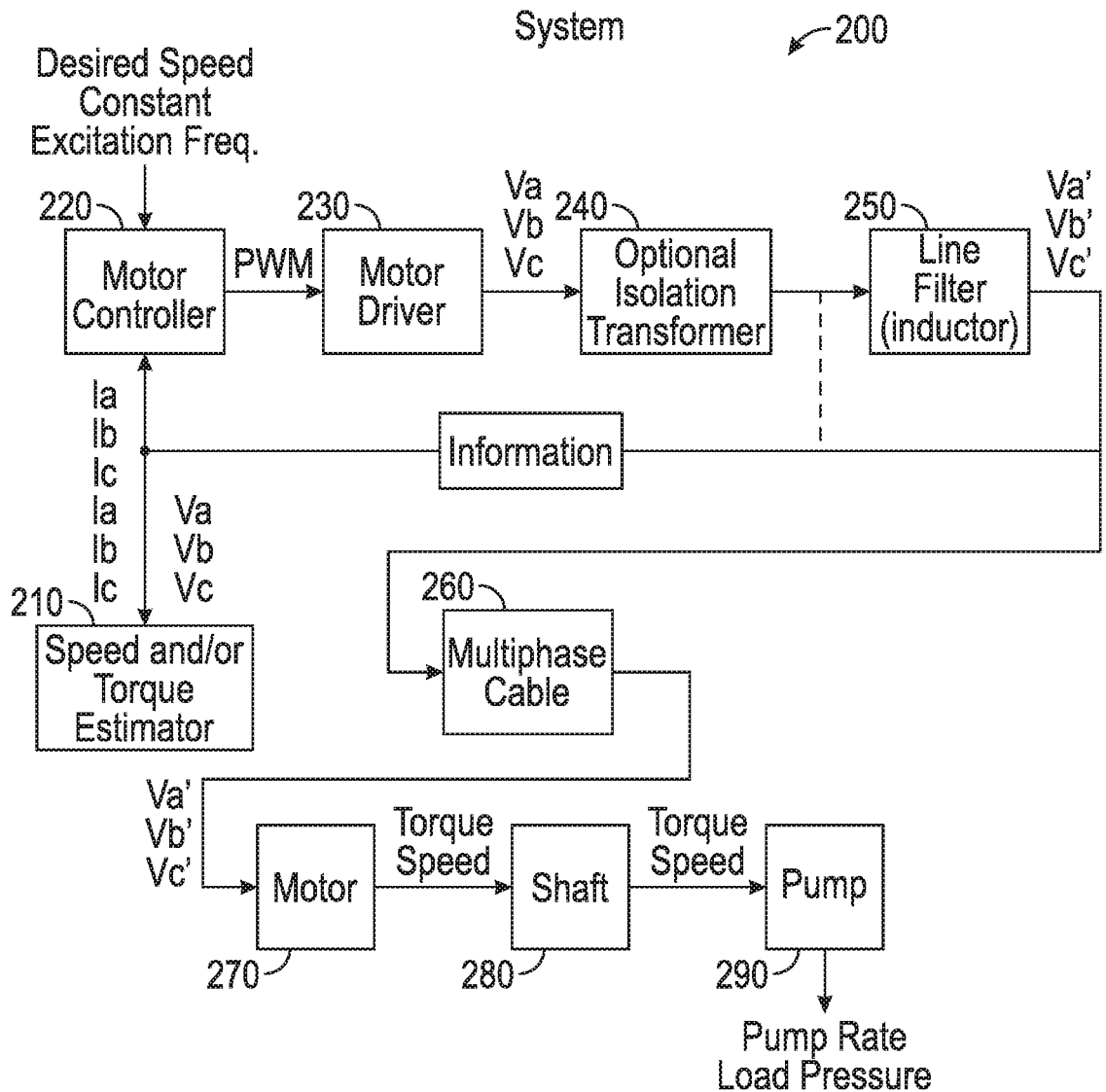
FIG. 2 illustrates a system and computing resources that may be used by embodiments of the disclosure.

FIG. 2 shows an example of an ESP system 200 and examples of computing resources 201 that may be used by embodiments of the disclosure to control the ESP system 200. The computing resources 201 may include one or more computers 202, one or more storage devices 205, one or more networks 206, and one or more modules 207. As to the one or more computers 202, each computer may include one or more processors (e.g., or processing cores) 203 and memory 204 for storing instructions (e.g., modules), for example, executable by at least one of the one or more processors 203. As an example, a computer 202 may include one or more network interfaces (e.g., wired or wireless), one or more graphics cards, a display interface (e.g., wired or wireless), etc. As an example, data may be provided in the storage device(s) 205 where the computer(s) 202 may access the data via the network(s) 206 and process the data via the module(s) 207, for example, as stored in the memory 204 and executed by the processor(s) 203. As an example, a computer-readable storage medium may be non-transitory and not a carrier wave. Such a storage medium may produce instructions for how to operate the ESP and the choke (or other valves in the flow path) as per the method presented here, and/or store these instructions and optionally other information where such instructions may be executable by one or more processors (e.g., of a computer, computers, a controller, controllers, etc.).

In FIG. 2, the system 200 is shown as a block diagram of an ESP system. As an example, such a system 200 may run closed loop, for example, with a control loop algorithm running inside the motor controller that tries to adjust the speed of the motor to a given desired speed or in an open loop. As shown, the system 200 can include a speed and/or torque estimator 210, a motor controller 220, a motor driver 230, an optional isolation transformer 240, a line filter 250, a multiphase cable 260 (e.g., consider a three-phase cable), a motor 270, a shaft 280 (e.g., single or multipiece, etc.), and a pump 290. As shown, information may be transmitted to the speed and/or torque estimator 210 and/or to the motor controller 220. Such information, as shown, can include voltage and current information. As indicated, such information or one or more portions thereof may be available at one or more points in an electrical power distribution system (e.g., prior to the line filter, as part of the line filter, after the line filter, etc.).

In the example of FIG. 2 the system 200 can be an electric submersible pump system that includes the motor 270 as a multiphase electric motor operatively coupled to the pump 290 as a fluid pump; the multiphase power cable 260 operatively coupled to the motor 270; and the controller 220 as part of a controller that includes an input that receives measurements as to power supplied to the motor 270 via the multiphase power cable 260 and that processes the measurements to estimate a pump rate of the pump 290.

As shown in FIG. 2, current and voltage information (e.g., via measurements, etc.) may be received by the speed and/or torque estimator and at least current information may be received by the motor controller 220.

As an example, in open loop operation a motor may not run in a controlled way. For example, for induction motors (IM) motor speed will settle based on the produced actuation torque and the load torque; whereas, for permanent magnet synchronous motors (PMS) motors, if driven with high enough excitation currents the motor rotor will follow synchronous to the excitation frequency. However, the load and actuation torque may not be very well known.

As an example, a system may be configured with circuitry to operate in a closed loop manner. For example, such a system may include one or more motors, which may include one or more of an induction motor (IM) and/or a permanent magnet synchronous motor (PMS). As an example, a system may include a control algorithm and a speed and position estimator that can run in a motor controller (e.g., via circuitry, which may include a processor, memory, instructions stored in memory and executable by the processor, etc.). As an example, excitation voltage may be known from driven PWM signals, except for motor driver "non-idealities". As an example, a system may include measuring current and operating a closed loop controller based on measured current (e.g., optionally as a single input measure).

As an example, a system may include an off the shelf motor drive that may have no access to PWM inputs. In such an example, voltages and currents can be measured and the motor speed and actuation torque can be estimated from the voltage and current measurements. As an example, such an approach may be implemented for a system that includes one or more IM motors.

As an example, a system may include circuitry that can reduce the effect of cable asymmetry. For asymmetrical cables, particularly for flat cables, where the phases are laid out side by side, the inductance can be unsymmetrical. For resistance, if the cable diameters are matched, the mismatch may be mainly related to temperature. To address asymmetry, as an example, an approach may consider compensation of the serial drop based on the nominal cable parameters; compensation of the unsymmetrical portion of the drop; and/or fuller compensation by combination of the transformer, line filter, cable and stator impedance.

Figure 3:
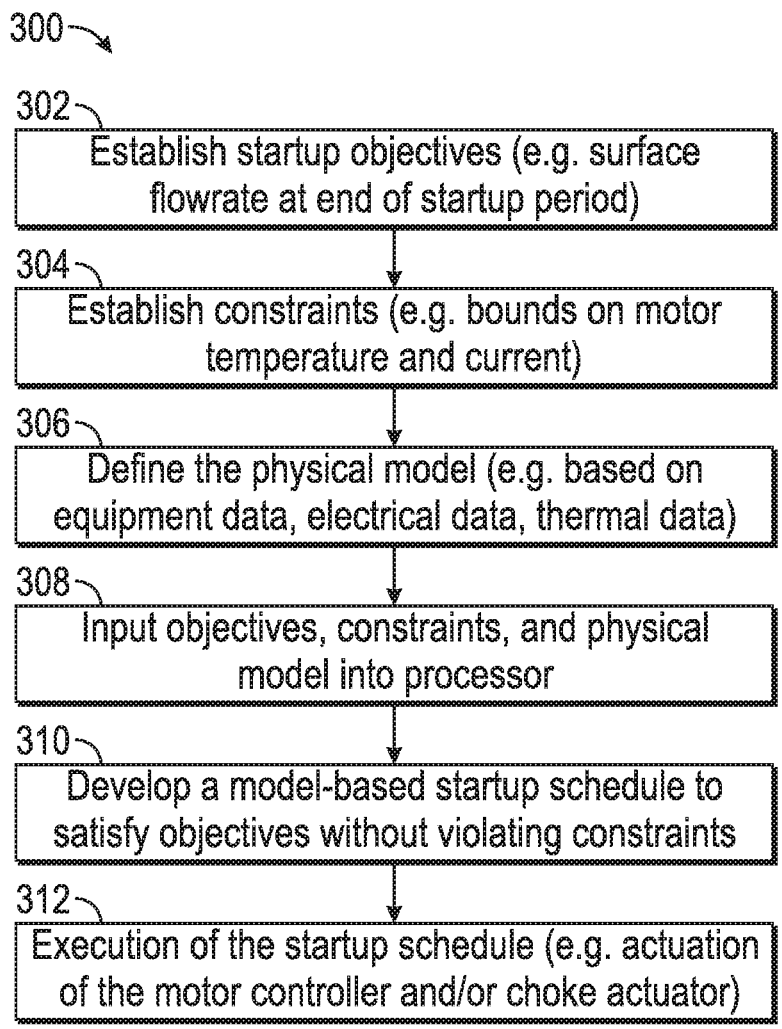
FIG. 3 illustrates an embodiment of the disclosure that provides a method for optimization of a model-based offline startup schedule for an ESP.

FIG. 3 illustrates an embodiment of the disclosure that provides a method, referred to generally as 300, for optimization of a model-based offline startup schedule for an ESP. Such embodiments may include developing a model-based startup schedule using optimization methods to satisfy objective(s) without violating constraint(s).

As shown in FIG. 3, the startup objectives are first established 302. The objectives are user defined and may be based on historical data, operator and/or engineering specifications, manufacturer specifications, or the like. For instance, a typical objective may be surface flowrate at the end of the startup period. Similarly, the constraints for the startup objectives must be established 304. The constraints are user defined and may be based on equipment manufacturing specifications, engineering specifications, or the like. Typical constraints may be upper and lower bounds on motor temperature and current. It should be understood that in some embodiments of the disclosure, the constraints may comprise both "hard" and "soft" constraints. The "soft" constraints may be violated if it is beneficial for the overall performance of the startup schedule, while the "hard" constraints, such as upper and lower bounds, must not be violated. Further, the constraints may be time dependent. For instance, if a temporary event occurs (e.g. sudden separator restriction), the speed and flowrate of the electric submersible pump may be lowered for the duration of the temporary event.

After establishing the startup objectives and the constraints, the physical model is defined 306. The physical model is based on equipment specifications, equipment performance models, electrical models, thermal models, and the like. The startup objectives, constraints, and the physical model are next input into a processor 308. The processor may be the computing resources 201 described with reference to FIG. 2 above.

The model-based startup schedule is then developed, based on the input, to satisfy the objectives without violating the constraints 310. Finally, the startup schedule is executed 312. In some embodiments, the startup schedule may be executed by actuation of the motor controller (such as the motor controller 220 shown in FIG. 2) and the choke actuator.

As an example of the embodiment of the disclosure described in FIG. 3, the ESP drive frequency and choke position (or choke pressure or choke differential pressure) time series may be established at the beginning of the startup process in an offline optimization and then applied to the system in an open-loop fashion (i.e. without re-computing the control actions based on feedback measurements). The startup profiles may be applied either manually or automatically by a processor, such as that discussed in FIG. 2.

In some embodiments of the disclosure described with reference to FIG. 3, the physical model is a reduced order model (ROM). The ROM may be well specific, i.e., based on parameters specific to one well and not generally useful for other wells. Although the ROM based model may be lower fidelity under certain conditions, the model executes much quicker.

Some embodiments of the disclosure comprise using a physical model (or ROM) that is calibrated offline where the calibration is based on the well and equipment response from a previous startup, e.g., on a specific well or a well within same or similar field. This may mean that the physical model is calibrated post-startup using time series data from the startup. This calibration procedure is conducted offline (not real-time). In such embodiments, the calibrated physical model may be a reduced order model ROM that may be well-specific. In other embodiments, the calibration procedure comprises machine learning processes.

Some embodiments of the disclosure may provide for calibration or re-calibration of the physical model to be ongoing during ESP operation (post startup). This may mean that the startup model is kept current with evolving reservoir, well and equipment conditions between startups.

In some embodiments of the disclosure optimization is ongoing offline at specified intervals during ESP operation so that a startup schedule is immediately available for the subsequent restart. In such embodiments, the workflow may use a full-fidelity physical model or a ROM and the physical model or ROM could be calibrated by one of the methods described above.

Figure 4:
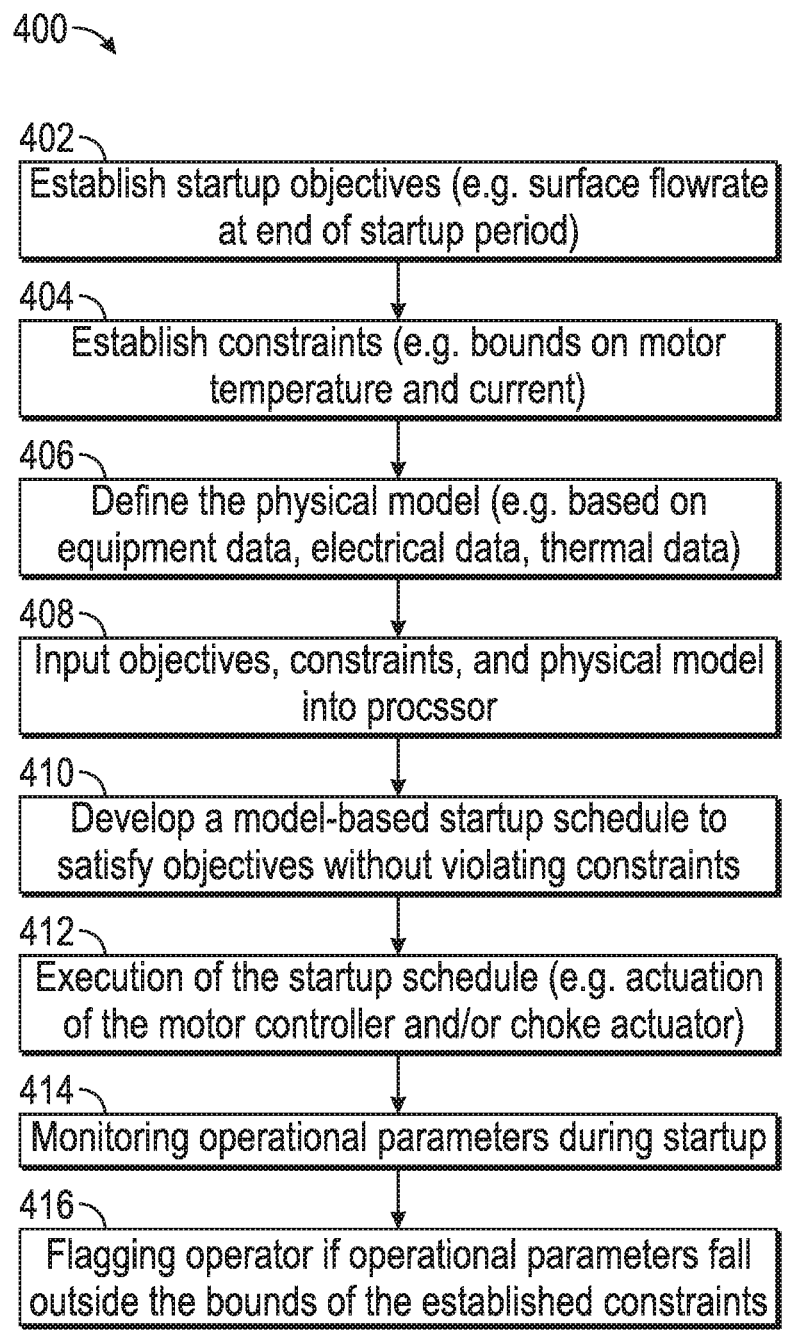
FIG. 4 illustrates an embodiment of the disclosure including real-time monitoring of a model-based offline startup schedule.

As shown in FIG. 4, some embodiments of the disclosure may include the real-time monitoring of a model-based offline startup schedule for an ESP, referred to generally as 400. As shown in FIG. 4, in this embodiment, similar to the embodiment described with reference to FIG. 3, the startup objectives are first established 402 along with the startup constraints 404. After establishing the startup objectives and the constraints, the physical model is defined 406. The startup objectives, constraints, and the physical model are next input into a processor 408 (e.g. computing resources 201 described with reference to FIG. 2) and a model-based startup schedule is developed 410. Next, the startup schedule is executed 412.

The embodiment of FIG. 4 further provides for monitoring operational parameters in real-time during startup 414. The monitoring is performed by a processor such as that described with reference to FIG. 2. The processor flags the operator if allowable bounds on critical parameters are breached based on the real-time data and the predetermined bounds 416. As described above, the bounds on the critical parameters are established offline and the operator is flagged in real-time if the monitored data falls outside of the predetermined bounds.

Figure 5:
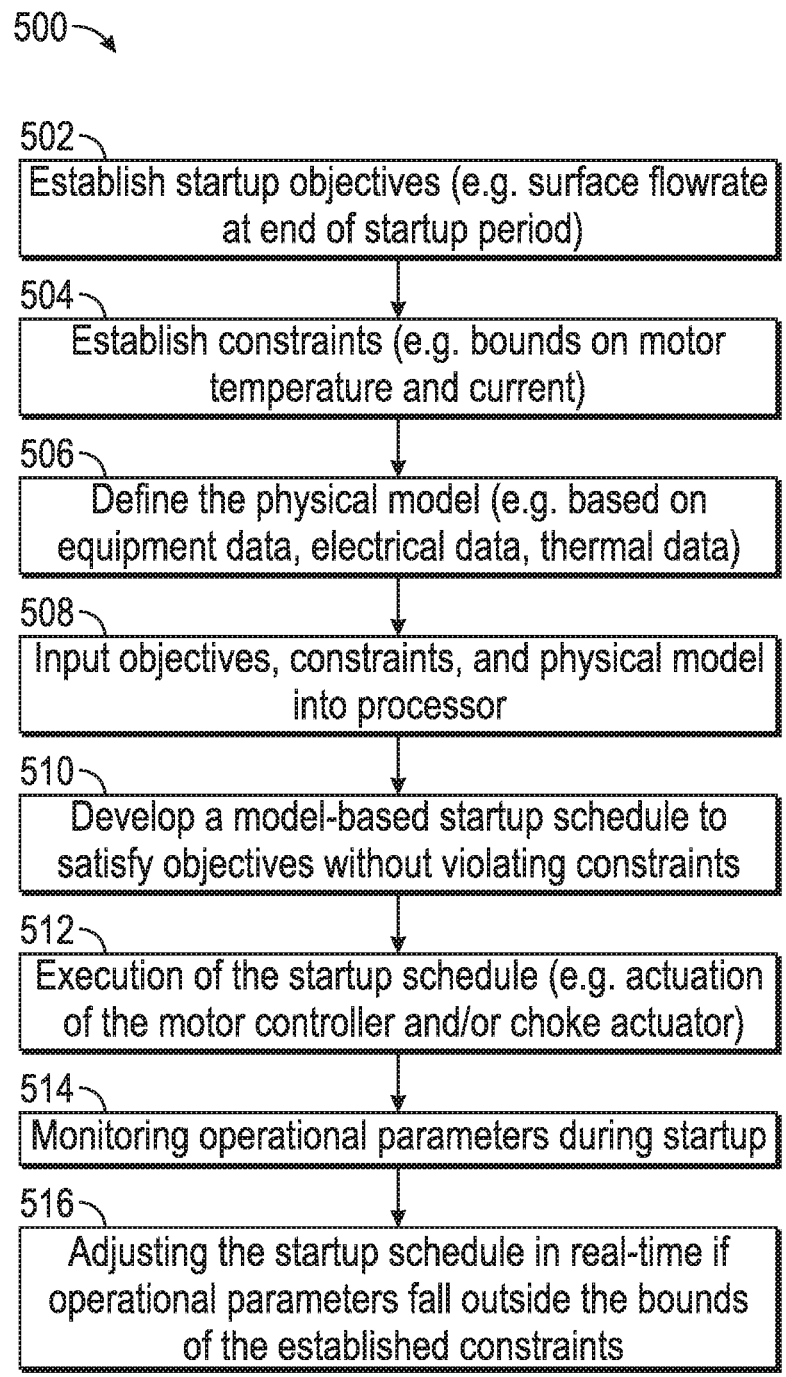
FIG. 5 illustrates an embodiment of the disclosure comprising real-time, automatic, adjustment of the startup schedule.

As shown in FIG. 5, some embodiments of the disclosure may comprise real-time, automatic, adjustment of the startup schedule 500. As shown in FIG. 5, in this embodiment, similar to the embodiment described with reference to FIG. 4, the startup objectives are established 502 along with the startup constraints 504 and the physical model is defined 506. The objectives, constraints, and physical model are input into a processor 508 and a model-based startup schedule is developed 510. The startup schedule is executed 512 and the operational parameters are monitored during startup 514. In this embodiment, if allowable bounds on critical parameters are breached based on the real-time data and the predetermined bounds, a real-time model-based adjustment of the startup schedule is executed 514. For instance, this real-time adjustment may comprise adjustment of the pump speed or choke setting during startup to keep the critical parameters within the allowable bounds.

Some embodiments of the disclosure may further comprise the embodiments illustrated in either FIG. 4 (400) or FIG. 5 (500) in combination with real-time model calibration (model inversion) based on real-time sensor data. In such embodiments, the model may be calibrated in real-time during the startup and the critical bounds are re-calculated based on the calibrated model. The model calibration process may occur multiple times during a startup. In such embodiments, the model may be used to adjust the startup in real-time (based on the model and sensor feedback) and may be calibrated in real-time during the startup, i.e., the model is not static but dynamically adapts to the system during the startup. In some embodiments, the calibrated model is a reduced order model (ROM) that may be well-specific. The calibrated model may be lower fidelity in certain conditions but will execute more quickly.

Figure 6:
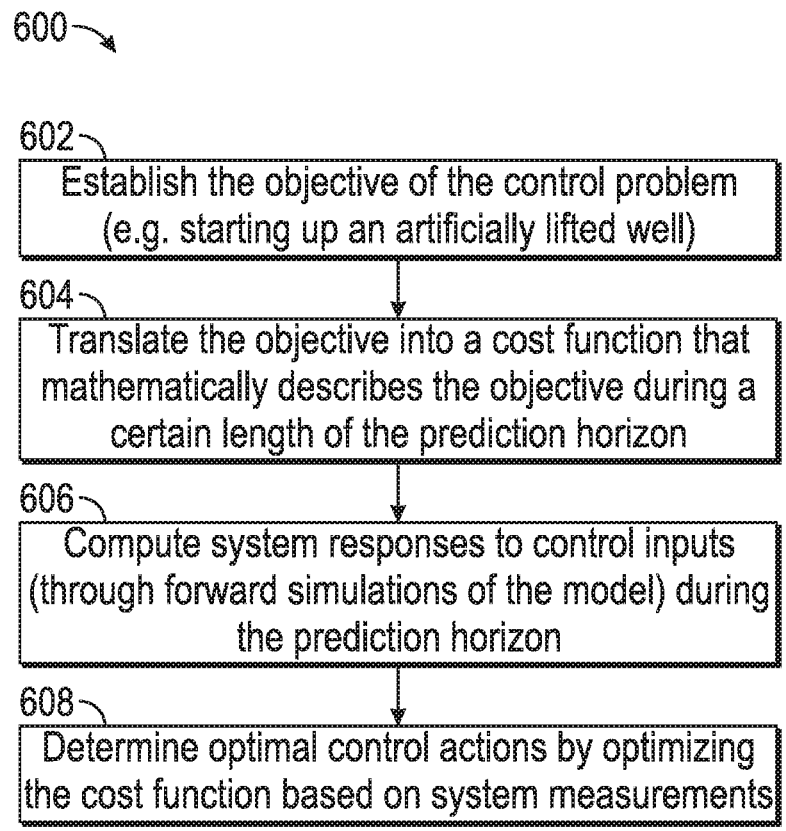
FIG. 6 illustrates an embodiment of the disclosure comprising a model-predictive control (MPC)

In some embodiments of the disclosure, illustrated in FIG. 6, a control algorithm for an ESP-lifted well startup is developed for use with model-predictive control (MPC) 600. MPC is an advanced control method that uses the system model to compute control actions that may be applied to the system by solving a constrained optimization problem. This means that the objective of the control problem (i.e. starting-up an artificially lifted well) 602 needs to be translated into a cost function that may mathematically describe the objective considering a certain length of the prediction horizon 604. The model of the system may be used to compute the system response (obtained by forward simulations of the model) during the prediction horizon which is affected by the control inputs applied to the system 606. The model-predictive controller finds the optimal control actions by optimizing the cost function defined in this way in every sample step (e.g. every 1 minute or so) taking the latest measurements and possibly state and parameter estimations from the system into account 608. A single-well system generally consists of two actuators: ESP and choke. In this embodiment, a processor, such as the computing resources 201 described with reference to FIG. 2, receives the inputs and executes the control actions. In some embodiments, the computing resources 201 may additionally solve the estimation and optimization problem. The computing resources may receive measurements from the system, estimate the missing variables, and compute the optimal changes of the pump and choke settings.

Using the MPC, a model of the system dynamics may be used by the controller to obtain the operating sequences for ESP speed and choke opening through solving an optimization problem. The hydraulic model of fluid flow in the system may be used together with models of other components of the system that are considered: mechanical (for the rotor dynamics), electrical (for the VSD, motor and cable), thermal (for the motor and pump), etc. The method can utilize both numerical models (e.g. OLGA) as well as analytical models, linear or nonlinear depending on the particular system. The objectives that are to be considered for the artificially-lifted well startup problem may include: (1) pump intake pressure and tubing head pressure should converge to their respective setpoints; (2) the resulting ESP speed and choke opening sequences should allow for gradual and smooth operation; (3) the pump should operate as close as possible to its best efficiency point whenever possible; (4) shaft vibrations should be avoided; (5) motor and/or pump overheating should be avoided; (6) and others subject to constraints related to: (i) pump speed and choke opening (hard constraint); (ii) maximum pressure gradient (soft constraint); (iii) maximum flow rate (soft constraint); (iv) pumps should operate within the optimal operating range (soft constraint); (v) torque availability (hard constraint); and (vi) separator capacity (hard constraint), for example.

In some example embodiments of the disclosure, the MPC method is used to calculate a time series of measurable variables such as pressures. Simple closed-loop controllers, such as a PID controller, may then vary the ESP frequency and wellhead choke position to regulate the pressures to the pressure time series from the MPC method.

In some embodiments of the disclosure, the method considers calculating the optimal control variables using MPC at every time-step using feedback from the latest measurements and possibly state and parameter estimations. The ESP speed and choke opening values may be automatically applied in the system in a closed-loop control approach. It should be understood that in some embodiments, the control variables additionally comprise other components of the system including but not limited to safety valves, flow line valves, and VSD parameters.

In some embodiments of the disclosure, the controller takes measurements from the system (from intake/discharge gauge and from the wellhead) and in response sends back the values of what the ESP speed (using VSD) or choke opening should be either for the current control step in the closed-loop operation or for the whole startup process in the open-loop operation. The algorithm can run on a computer or microcontroller either local to the wellsite or remotely via SCADA or other communication methods (e.g. as described in reference to FIG. 2). The controller may benefit the process of starting a well by ensuring stable production faster, starting the system in a more controlled manner thereby minimizing possible oscillations in pressure/flow-rates, and minimizing damage to both the ESP and sand-face during startup events.

The foregoing objectives and constraints may be considered, among other such elements, to establish flow from a well, taking care of the reservoir (e.g., to avoid formation damage), the pump (e.g., to prolong its life), and the processing facilities (e.g., by avoiding large pressure fluctuations) taking into account any operational constraints that may be in place. When looking at the well-tailored approach (e.g., the pump and choke operating sequences are selected for a particular well), two options are possible: (1) only the dynamics of one wellbore are considered with a fixed boundary condition at the wellhead; and (ii) a number of wells are considered that are producing to a common manifold, therefore the wells are interacting with each other.

Figure 7:
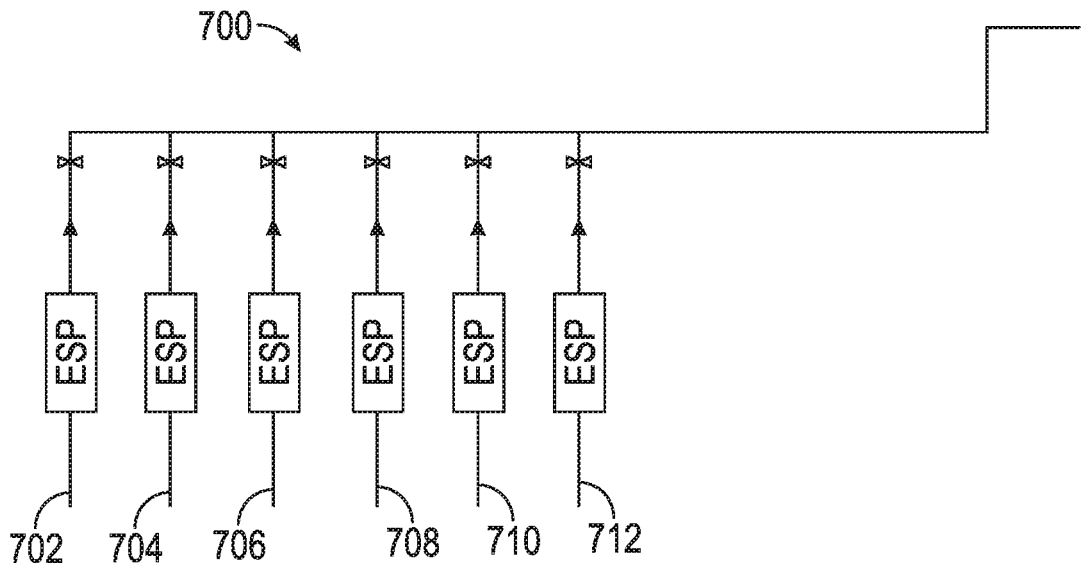
FIG. 7 is an illustration of an example multi-well system, according to an embodiment of the disclosure.

In addition, for a multi-well system 700, when a number of wells 702, 704, 706, 708, 710, 712 are considered at the same time, see FIG. 7, one may either decide to follow a well-tailored approach (even though the dynamics of a larger system with multiple wells may be looked at) or to follow a standardized approach where the same profiles (for ESP speed and choke opening) must be selected for all wells considered at a given time (e.g. the wells may be from the same platform). By definition, the well-tailored approach may be able to provide a superior performance over a multi-well standardized approach. However, when a human operator is a part of the control loop and in particular the operator's job is to manually enter the changing profiles of ESP speed and choke opening, the standardized profiles offer a balance between an improved performance over the currently used heuristics and an ease of application since the same profile would be applied to a number of wells. In the multi-well 700 case, if there is significant variation between the different ESP lifted wells 702, 704, 706, 708, 710, 712 such that the multi-well solution is far from optimal or violates certain constraints for certain wells then several multi-well startup procedures can be computed. The minimal set of procedures can be calculated, either manually or automatically, by combining the MPC method with a higher level optimizer.

In some further embodiments the method may apply deliberate small perturbations to the optimal ESP speed and choke opening sequences to achieve more richness of the system response in order to improve state and parameter estimation during and post startup. The importance of this is prominent in particular during the post-startup period, when the control actions could otherwise remain mostly unchanged when in a steady operation, which could result in an ill-posed inverse problem associated with the state and parameter estimation. The rationale behind enforcing small deliberate perturbation to the original optimal sequences for operating the ESP and choke serves to ensure that the persistence of excitation condition is met to facilitate the estimation process from the input-output data. The selection of the parameters describing the perturbation that affect the resulting system response under the perturbed inputs can be in part user-defined, and the controlled manner of execution of the perturbations mean that the existing objectives and constraints (such as protection of the reservoir, wellbore, and the equipment during and post startup etc.) stay valid and so the overall system performance satisfies the requirements.

Figure 8A:
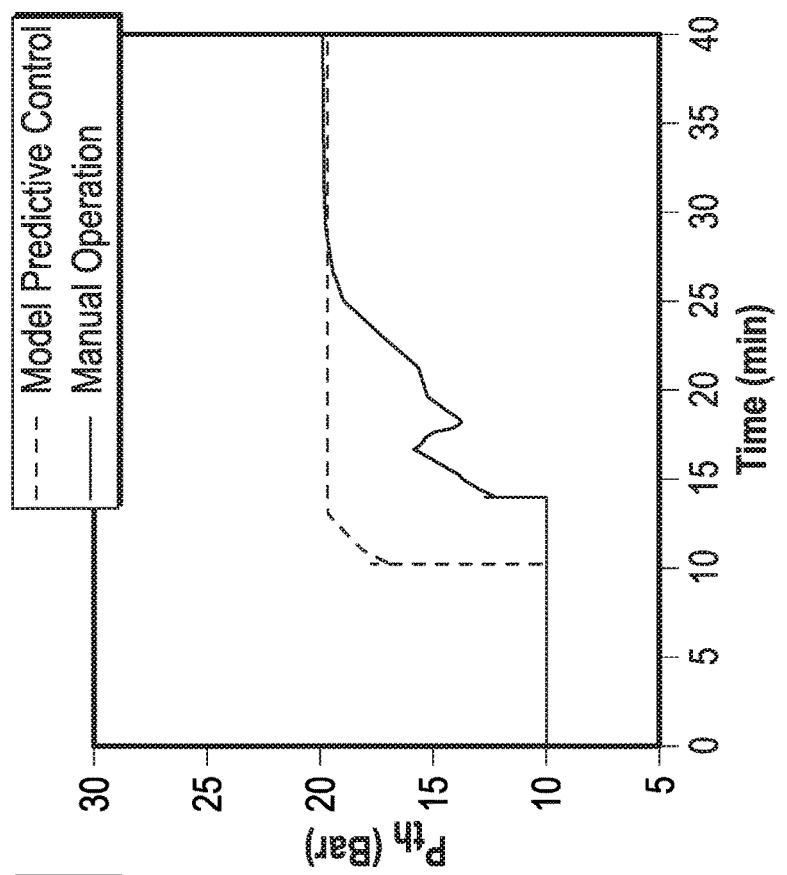
FIG. 8A is an illustration comparing intake pressure for manual operation (solid line) with a method (dashed line) according to an embodiment of the disclosure.
Figure 8B:
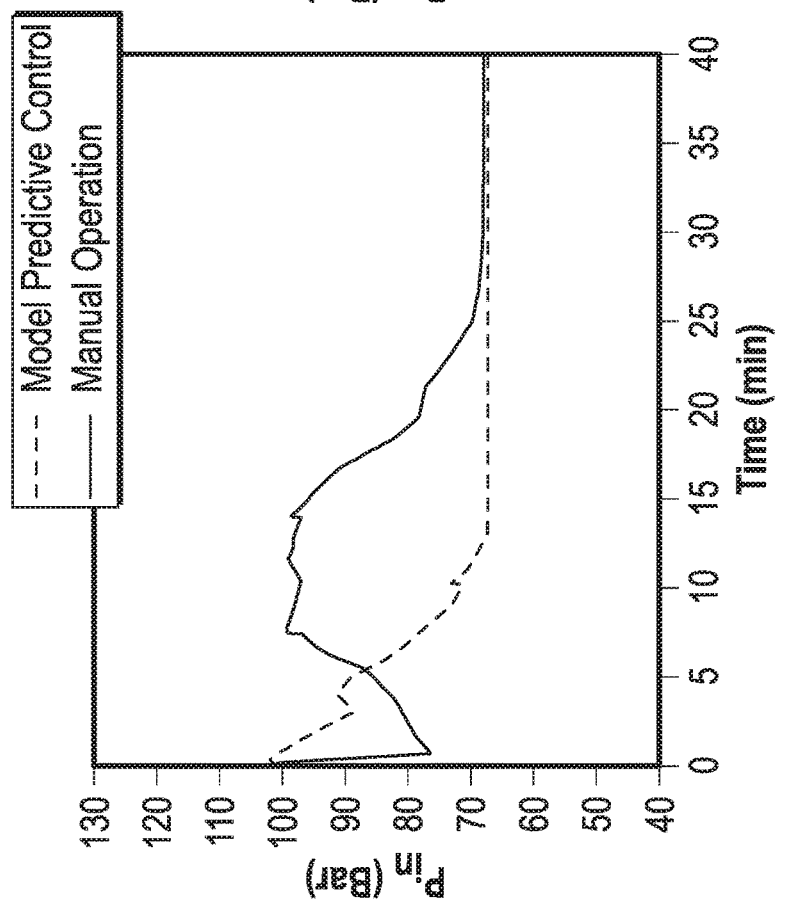
FIG. 8B is an illustration comparing tubing head pressure for manual operation (solid line) with a method (dashed line) according to an embodiment of the disclosure.
Figure 9:
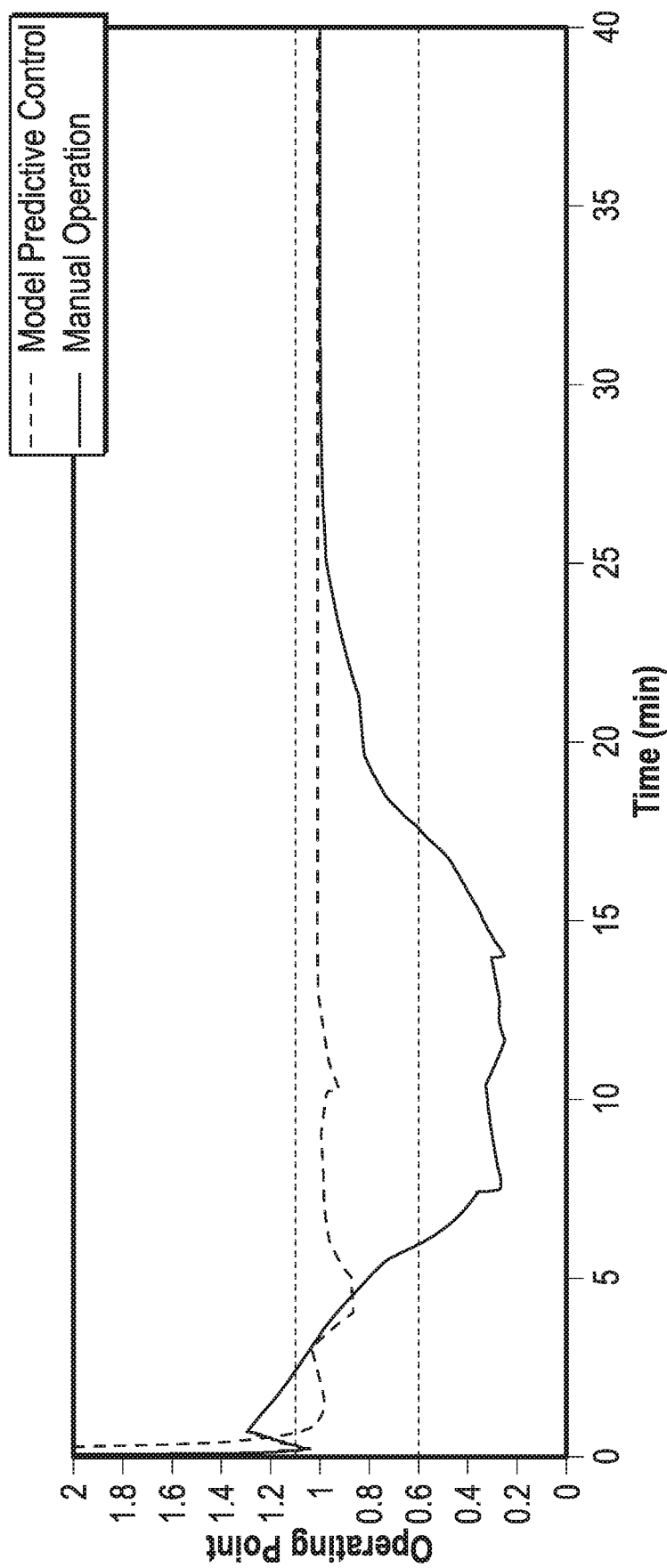
FIG. 9 is an illustration comparing operating point ("OP") for manual operation (solid line) with a method (dashed line) according to an embodiment of the disclosure (note: value 1 means OP=best efficiency point; the dashed lines represent the approximate optimal operating range of the pump)
Figure 10A:
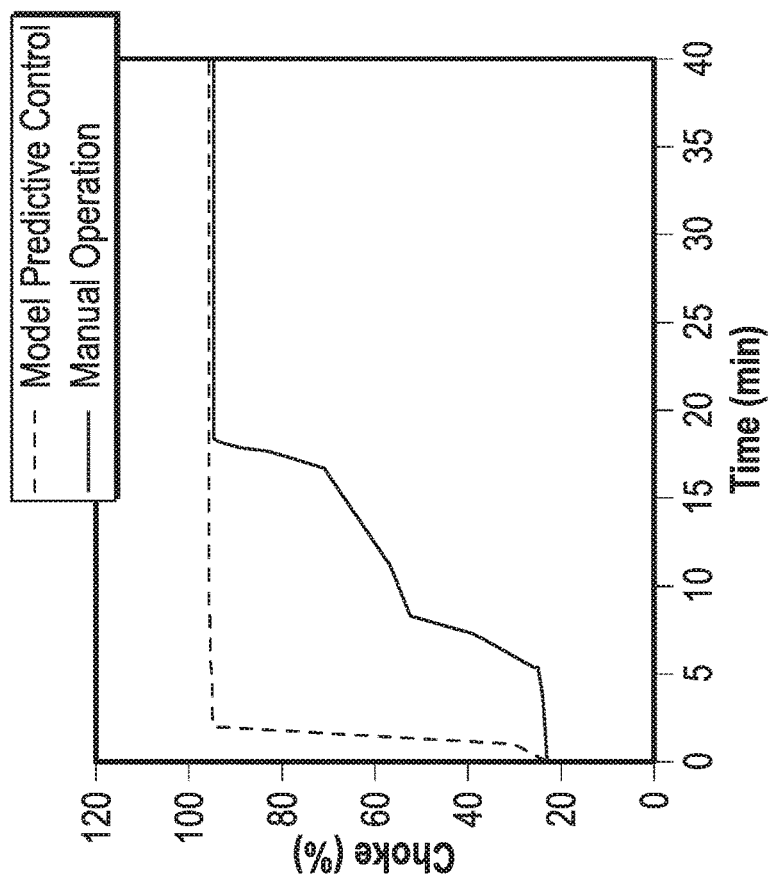
FIG. 10A is an illustration comparing pump speed sequences for manual operation (solid line) with a method (dashed line) according to an embodiment of the disclosure.
Figure 10B:
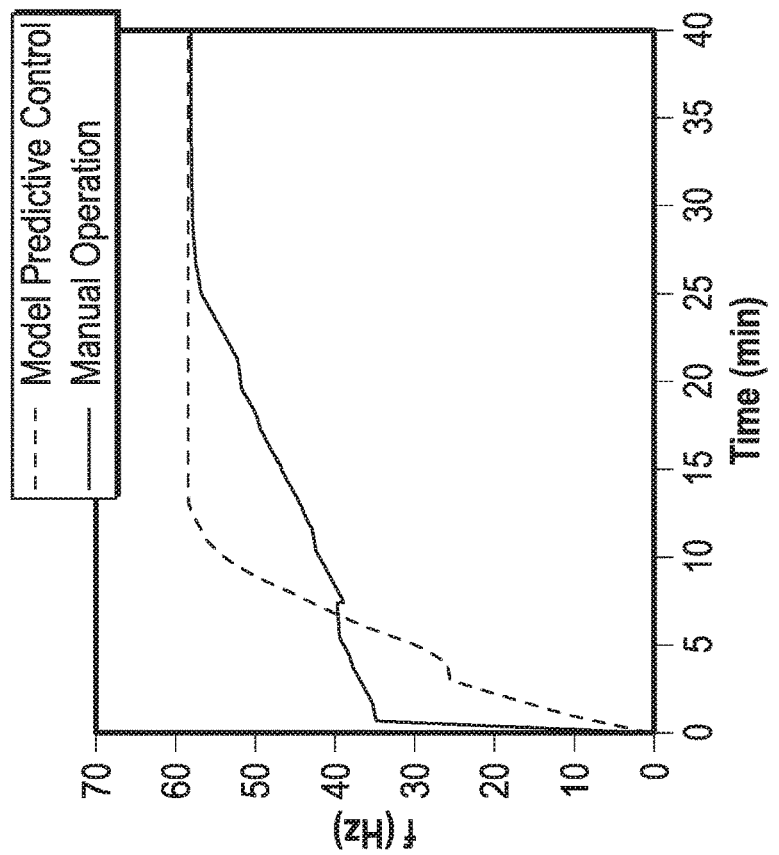
FIG. 10B is an illustration comparing choke opening sequences for manual operation (solid line) with a method (dashed line) according to an embodiment of the disclosure.

With reference to FIGS. 8-10, a stimulation study was conducted demonstrating the efficacy of model-predictive control over manual operation as well as over simpler feedback control. In this study, the following performance indicators were considered:

Objective:
Pump intake pressure and tubing head pressure should converge to their respective set points; and
Gradual and smooth changes of ESP speed and choke opening.

Constraints:
ESP speed hard constraint;
Choke opening hard constraint;
Pumps should operate within the optimal operating range→soft constraint; and
To avoid formation damage:

$$\left|\frac{dP_{in}}{dt}\right| \leq \Delta$$

→soft constraint.

In FIGS. 8-10 the dashed line gives results with the disclosed method and the solid line gives results when manual operating sequences are applied to the model. With an embodiment of the method proposed herein, pump intake pressure and tubing-head pressure converge to their setpoints more steadily and with smaller fluctuations (see FIGS. 8A and 8B). In addition, the embodiment of the disclosed method is able to navigate the system to operate within the optimal operating range of the pump much faster than with manual operating sequences. Notice the period between approximately 6 and 18 minutes when the manual operating sequences result in the operating range being below the optimal operating range which is associated with a low flow through the pump and consequently a possible damage to the pump due to overheating and downthrust. The embodiment of the method relying on model-predictive control does not suffer from this problem. The ESP speed sequence and choke opening sequence that the embodiment produced is shown in FIGS. 8A and 8B (dashed line) together with the sequences for manual operation that were applied in the field.

Although a few embodiments of the disclosure have been described in detail above, those of ordinary skill in the art will readily appreciate that many modifications are possible without materially departing from the teachings of this disclosure. For instance, some embodiments use online parameter estimation to adapt the model and/or controller parameters to the measured system response. Some embodiments may use state estimation to infer unmeasured variables from other sensor readings (for instance to obtain an estimate of a flow-rate through the pump, a virtual flow metering technique e.g. PCL can be used, or alternatively a state observer such as a moving-horizon observer, a particle-filtering-based observer, and others can be used).

In some embodiments of the disclosure different levels of model fidelity may be used. This may mean that the controller may switch between different models and utilise a higher fidelity model for some time (e.g. in the initial phase of the startup) and a lower fidelity model at a later time. Another embodiment uses a high fidelity model to pre-compute solutions offline beforehand and then uses these pre-computed solutions as starting points for online computations with a lower-fidelity model (to reduce computational time) in a closed-loop fashion.

In some embodiments, the length of the prediction horizon can be selected according to different needs. For instance, when the operating sequences need to be computed offline then a longer prediction horizon may be used since the computational time is not such a burden. At the same time, a shorter prediction horizon could be applied for online computations to reduce computational time. The length of the control horizon can also be reduced to be less than the prediction horizon, again to improve computation time.

While ESP-lifted wells are discussed here, the method could work (with modifications) for other pumps too such as PCP, sucker rod pump, seabed booster pump (one may also have multiple pumps e.g. in-well ESPs and seabed booster pump in series). Other devices such as ICD, ICV, and SSV can be considered too.

In some embodiments of the disclosure, the method uses a nonlinear model of the system. In some embodiments of the disclosure, the method uses a linear model of the system. In some embodiments of the disclosure, the method uses a reduced-order model and the online optimization may use the simplified model to make the optimization problem more computationally efficient to solve online. In some embodiments of the disclosure, the method does not consider the wellhead choke if the choke is not present.

In some embodiments of the disclosure, an intake/discharge gauge and wellhead measurements provide readings of the intake, discharge and tubing-head pressures. The algorithm utilizes the flow-rate information but if the well instrumentation does not supply such a reading directly, flow-rate estimation techniques may be used to infer the value based on other sensor information using a model of the system.

In some embodiments of the disclosure, the available measurements may be read by the control algorithm along with providing the model of the system (where the system is understood as either individual well or a number of wells that may be connected with each other by a joint manifold) and consequently new values for ESP speed and choke opening are provided. By resorting to state estimation techniques (e.g. to obtain the value of the flow-rate if required) and allowing for model parameter estimation (e.g. pump temperature), the resulting algorithm may become an adaptive output-feedback model-predictive controller.

Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method for developing a model-based offline startup schedule for an electric submersible pump, the method comprising the steps of:
   (a) defining startup operational parameters comprising an intake pressure and an electric submersible pump drive frequency to achieve by an end of the startup schedule;
   (b) setting constraints for the startup operational parameters to remain within;
   (c) defining a physical model;
   (d) entering the startup operational parameters, the constraints for the startup operational parameters, and the physical model into a processor to develop the model-based offline startup schedule based on the startup operational parameters to achieve by the end of the startup schedule, the constraints, and the physical model; and
   (e) executing the model-based offline startup schedule for the electric submersible pump including achieving at least the electric submersible pump drive frequency in an open loop process such that the electric submersible pump drive frequency is achieved without redeveloping the model-based offline startup schedule based on feedback information.

2. The method of claim 1, wherein the startup operational parameters comprise a target surface flowrate to achieve by the end of the startup schedule.

3. The method of claim 1, wherein the constraints comprise bounds on a motor temperature and current.

4. The method of claim 1, wherein the electric submersible pump has a choke and the model-based offline startup schedule is applied to achieve the electric submersible pump drive frequency and a choke position.

5. The method of claim 4, wherein the model-based offline startup schedule is applied to achieve the electric submersible pump drive frequency and the choke position in the open loop process such that the electric submersible pump drive frequency and the choke position are achieved without redeveloping the model-based offline startup schedule based on the feedback information.

6. The method of claim 1, wherein the physical model is a reduced order physical model.

7. The method of claim 6, further comprising the step of identifying when the startup operational parameters fall outside of the constraints.

8. The method of claim 1, wherein the physical model is a linearized physical model.

9. The method of claim 1, further comprising the step of monitoring the startup operational parameters in real-time.

10. A method of developing a model-based offline startup schedule for an electric submersible pump, the method comprising:
    setting constraints for startup operational parameters comprising an intake pressure and an electric submersible pump drive frequency to achieve by an end of the startup schedule;
    defining a physical model;
    entering the constraints for the startup operational parameters, and the physical model into a processor to develop the model-based offline startup schedule based on the startup operational parameters to achieve by the end of the startup schedule, the constraints, and the physical model; and
    executing the model-based offline startup schedule for the electric submersible pump including achieving at least the electric submersible pump drive frequency in an open loop process such that the electric submersible pump drive frequency is achieved without redeveloping the model-based offline startup schedule based on feedback information.

11. The method of claim 10, wherein the startup operational parameters comprise a target surface flowrate to achieve by the end of the startup schedule.

* * * * *